United States Patent [19]

Lesokhin et al.

[11] 4,149,101
[45] Apr. 10, 1979

[54] ARRANGEMENT FOR LOCKING SLOT WEDGES RETAINING ELECTRIC WINDINGS

[76] Inventors: Albert Z. Lesokhin, ulitsa Chekhova, 8, kv. 22; Mikhail R. Semenov, ulitsa Kubinskaya, 66, kv. 35; Evelina A. Daikhovskaya, ulitsa Basseinaya, 85, kv. 202, all of Leningrad, U.S.S.R.

[21] Appl. No.: 796,065

[22] Filed: May 12, 1977

[51] Int. Cl.² .............................................. H02K 3/48
[52] U.S. Cl. ........................................ 310/214; 310/58
[58] Field of Search ................... 310/214, 52, 215, 58, 310/194, 43, 192, 59, 65; 336/196, 197

[56] References Cited

U.S. PATENT DOCUMENTS

| | | | |
|---|---|---|---|
| 984,182 | 2/1911 | Barr | 310/214 |
| 2,316,635 | 4/1943 | Staak | 310/214 |
| 2,723,358 | 11/1955 | Holmgren | 310/214 |
| 3,009,073 | 11/1961 | Drabik | 310/214 |
| 3,139,550 | 6/1964 | Geer | 310/214 |
| 3,740,601 | 6/1973 | Amasino | 310/214 |
| 4,015,156 | 3/1977 | Johrde | 310/214 |

FOREIGN PATENT DOCUMENTS

| | | | |
|---|---|---|---|
| 1100499 | 1/1968 | United Kingdom | 310/214 |
| 425265 | 9/1974 | U.S.S.R. | 310/214 |

*Primary Examiner*—R. Skudy
*Attorney, Agent, or Firm*—Lackenbach, Lilling & Siegel

[57] ABSTRACT

An arrangement for locking slot wedges retaining the winding of an electric machine against displacement thereof within the longitudinal slots of the magnetic core. The locking arrangement is disposed in the end portions of the slot and comprises locking wedges in contact with the extreme slot wedges and the locking wedges have teeth on the surfaces parallel to the bottom of the longitudinal slot. Stop collars are disposed at the intersection of the longitudinal slots and extreme radial ventilating ducts and embrace the locking wedges within a tooth portion thereof. Each tooth is defined by an inclined surface facing the central portion of the longitudinal slot from the ends thereof and a surface perpendicular to the axis of the core. The stop collars are shaped congruent to the locking wedge within a tooth portion thereof and are spaced from the lateral sides thereof. One end face of the stop collar is in contact with the surface of the tooth formed by a plane perpendicular to the core axis, while the other end face of the stop collar bears against the surface of the radial ventilating duct. Such a construction permits movement of the locking wedge only toward the central portion of the core, thus locking the slot wedges securely in place and preventing them from coming out of the longitudinal core slot.

9 Claims, 5 Drawing Figures

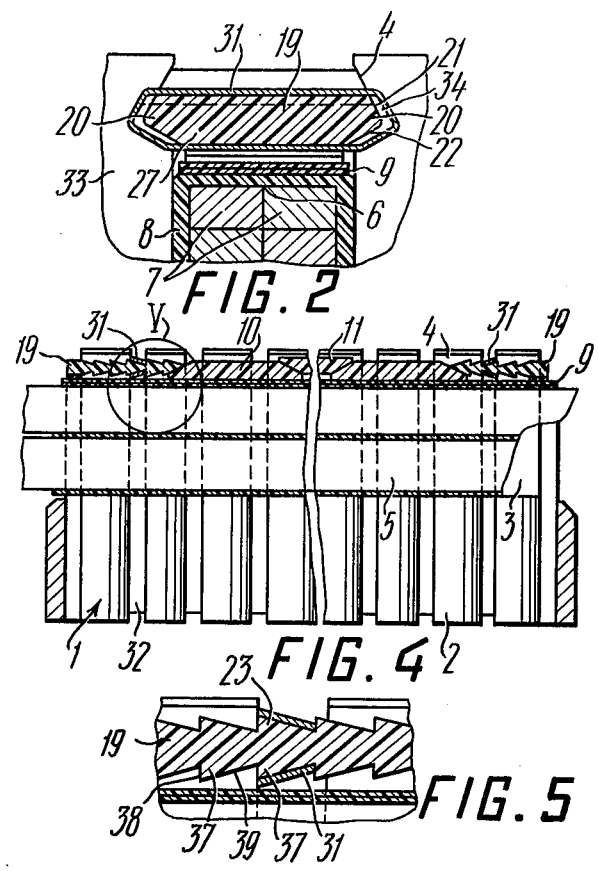

ARRANGEMENT FOR LOCKING SLOT WEDGES RETAINING ELECTRIC WINDINGS

The present invention relates to an arrangement for securing windings in the slots of an electric machine core, and more particularly to arrangements for locking slot wedges which serve to retain the electric windings of an electric machine core.

The present invention can be most successfully used in arrangements for securing the slot portions of the winding of an electric machine stator or rotor, for locking slot wedges, including counter-faced ones, to preclude their axial displacement under the effect of dynamoelectric forces and mechanical vibrations.

In a stator or a rotor of an electric machine, such as a heavy-duty alternator, insulated bars constituting an electric winding are disposed in longitudinal core slots arranged over the periphery of the core. The winding bars are held in place within the slots by wedges placed on top of these bars, to restrict their movement in a radial or axial direction.

After the electric machine has been in service for some time, the tightness of the fit of the slot wedges may be considerably reduced due to the effect of electric and mechanical forces, aging of the holding members and the winding insulation, or due to other reasons. In the course of the electric machine operation the winding bars in the core slots experience periodic radial vibrations and can even resonate at some frequencies under certain conditions, thus causing severe erosional damage to the bar insulation because of slot discharges taking place as a result of interruptions of the capacitive current as the bars move formation of cracks in the conductor strands of the bars, mechanical abrasion of the insulation and consequent breakdown thereof, as well as generating acoustic noises. Moreover, reduced tightness of the slot wedge fit may lead to the wedge travelling within the longitudinal slot of the core and even coming out of the slot, resulting in severe damage to the windings and other parts of the electric machine. These faults are so significant that they appreciably reduce the life of the electric machine, and require more frequent repairs.

In prior-art arrangements, the slot portions of the winding have been retained by wedges of uniform cross section over the whole length thereof. Such wedges fail to compensate for or to provide for sufficient taking-up of radial clearances between the winding bar and the slot due to tolerance build-up and/or variations in the size of the bars and the core slot resulting from the manufacturing process, and so filler strips of varying thickness have to be inserted between the wedge and the bars.

Both the manufacture and setting of such wedges during the assembly and repair of an electric machine are easy enough but using the wedges it is difficult to provide the desired radial pressure on the winding bars. Should it be necessary to tighten such conventional type wedges after the electric machine has been in operation for some time, they must be removed from the slot and a thicker filler strip inserted, after which the wedges can be reinserted. Frequently new sets of wedges have to be used. Consequently, the fitting time during assembly and repair of the electric machine increases. Such a wedge is locked in position exclusively by virtue of frictional forces which, naturally, diminish in the course of time.

It has also been known to retain the slot portions of the winding by providing wedge members of two types which alternate along the slot and have at their respective end portions mating and oppositely inclined surfaces. When wedging the winding, the wedges of the first type with their inclined portions forced against the mating inclined portions of the wedges of the second type are moved axially within the slots, the inclined portions of the first wedges sliding over the mating inclined portions of the second wedges, exerting thereby radial pressure on the latter and, consequently, on the winding.

Securing the wedges, once inserted, against movement in an axial direction can be ensured by "herringbone" or slanting slits made on the side portions of the first type of wedges and providing for tight engagement with the side walls of the slot. Locking the wedges by the slits on the side portions thereof, however, is not sufficiently reliable, since the engagement between the wedge side surfaces and the slot walls provided by these slits is not tight enough, and both the slits and the side faces of the wedges are apt to wear off during wedging and operation of the electric machine. In addition, if the winding has become loose in the slot for some reason or other, tightening the wedges is accomplished by moving each preceding "herringbone"-slitted wedge toward the center of the slot, which is considered or deemed inconvenient.

Accordingly, it is an object of the present invention to provide a locking arrangement for preventing axial displacement of the wedges within the core slot of an electric machine.

Another object of the present invention is to provide a locking arrangement capable of preventing the wedges from coming out of the core slot under the effect of electrical and mechanical forces during operation of the electric machine.

A further object of the present invention is to increase the reliability of retaining the winding in the core slot of an electric machine.

These and other objects of the invention are achieved by an arrangement for locking slot wedges for retaining electric windings within the longitudinal slots of the magnetic core of an electric machine. The winding are arranged around the periphery of the core and the core has radial ventilating ducts extending across the longitudinal slots of the core that have longitudinal grooves in the top portions thereof. Locking wedges disposed in the end portions of each longitudinal slot, contact the extreme slot wedges and have lugs on their side faces engaging the side grooves of the longitudinal slot. The locking wedges are designed to preclude axial movement of the slot wedges within the longitudinal slots, and each locking wedge is provided, on the surfaces parallel to the bottom of the longitudinal slot, with a plurality of teeth. The teeth are defined by an inclined plane facing the central portion of the longitudinal slot from the ends thereof and a plane perpendicular to the axis of the magnetic core, and are embraced by a stop collar. The collar is disposed at the points of intersection of the longitudinal slots and the extreme ventilating ducts and shaped congruent to the locking wedge within a tooth portion thereof. The portions of the stop collar facing the winding are in tight contact with the mating portions of the locking wedge, while the inner side portions of the stop collar are spaced from the lateral sides of the locking wedge, and the clearances formed therebetween enabling the locking wedge to be urged toward the central portion of the longitudinal slot from the ends thereof. One end face of the stop collar contacts the surface of the locking wedge tooth defined by the plane perpendicular to the axis of the core, and the other end face of the stop collar bears against the surface of the extreme radial ventilating duct.

In accordance with one embodiment of the invention, the teeth are provided on the outer side of the locking wedge.

In accordance with another embodiment of the invention, the teeth are provided both on the outer and on the inner side of the locking wedge.

The stop collars are preferably formed of a resilient material.

The proposed arrangement for locking the slot wedge makes it readily possible to tighten the loosened wedges in the core slot of an electric machine without the necessity of disassembling the machine and moving, each wedge separately in the slot, and the novel arrangement substantially minimizes release of pressure on the winding due to the axial displacement of the wedges, and also contributes to a higher reliability of the entire electric machine.

Other objects and advantages of the present invention will become apparent from the following detailed description taken in conjunction with the accompanying drawings, in which:

FIG. 2 is a cross-sectional view of an arrangement for locking the wedges in the slot, taken along line II—II of FIG. 1;

FIG. 4 is a longitudinal sectional view of a modified embodiment of the locking device; and FIG. 5 is an enlarged fragmentary view of the portion circled and marked with roman numeral V in FIG. 4.

Figure 1:
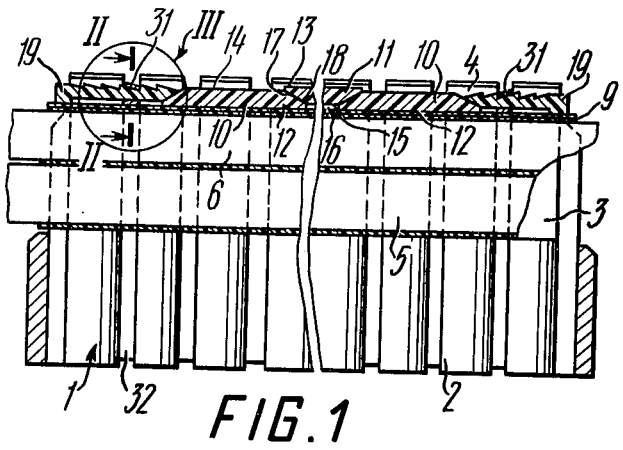
FIG. 1 is a longitudinal sectional view of a stator core with an arrangement for locking the wedges in position within the slot of an electric machine, according to an embodiment of the invention.

Referring now to FIG. 1, a magnetic core, such as a core 1 of an electric machine stator, is made up of stacked laminations 2 shaped so as to define a number of longitudinal slots 3 rectangular in cross section. These longitudinal slots 3 extend parallel to the axis of the core 1 and are uniformly arranged around the periphery thereof. The longitudinal slot 3 has undercuts or grooves 4 (FIG. 2) in the side walls thereof, disposed near the top of the slot 3 and forming a dovetail configuration.

Disposed in the slot 3 is an electric machine winding 5 comprised of bars, of which only an upper bar 6 is shown in FIG. 2, consisting of a plurality of insulated conductor strands 7 surrounded by a heavy layer of ground insulation 8. Disposed on top of the upper bar 6 along the slot 3 is an insulating filler strip 9. Located above the filler strip 9 (FIG. 1) is a plurality of slot wedges 10 and 11 arranged end-to-end and retaining the winding 5, the wedges 10 being the extreme wedges in the row. An inner side 12 of the slot wedge 10 and an outer side 13 of the slot wedge 11, as well as an outer side portion 14 of the slot wedge 10 and an inner side portion 15 of the slot wedge 11 are defined by planes parallel to the bottom of the longitudinal slot 3. In this case, the inner side 12 of the slot wedge 10 rests on the filler strip 9, while the inner side 15 of the slot wedge 11 is disposed thereabove with a certain clearance 16. At their end portions the slot wedges 10 and 11 have oppositely inclined surfaces 17 and 18, respectively, the inclined surfaces 17 of the slot wedges 10 adjoining the corresponding inclined surfaces 18 of the slot wedges 11. Side faces of each of the wedges 10 are flat and parallel to the side faces of the longitudinal slot 3, while side faces of each of the wedges 11 have lugs shaped so as to have a dovetail configuration in cross section. The wedges 11 are arranged to slide longitudinally in the slot 3 along the corresponding grooves 4 which are also correspondingly dovetail-shaped. As the wedges 10 and 11 are moved in the longitudinal slot 3 from the end portions thereof toward the central portion of the core 1, due to the sliding action between the two inclined surfaces a downward radial pressure is exerted on the winding 5, thus causing the winding 5 to be retained within the slot 3 of the electric machine core 1.

Disposed in the end portions of the slot 3 are locking wedges 14 designed so as to cooperate with the extreme slot wedges 10 and to provide an arrangement for locking the slot wedges in position, which is the subject of the present invention.

Figure 3:
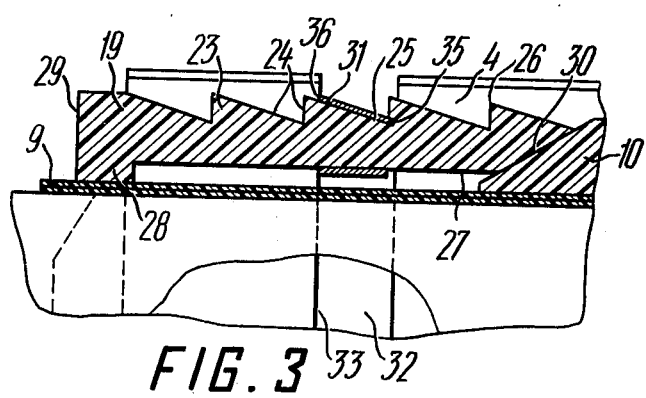
FIG. 3 is an enlarged fragmentary view of the portion circled and marked with roman numeral III in FIG. 1.

Side portions of the locking wedges 19 and side portions of the slot wedges 11 have lugs 20 (FIG. 2) which are also dovetail-shaped, defined by inclined surfaces 21 and 22 and they enable the locking wedges 19 and the slot wedges 11 also to slide in the slot 3 along the grooves 4. Unlike the wedges 10 and 11, however, the outer surface of the locking wedge 19 has teeth 23 (FIG. 3) defined by vertical surfaces 24 perpendicular to the core axis and inclined surfaces 25 facing the center of the longitudinal slot 3. Intersection of the vertical surface 24 and the inclined surface 25 forms a crest 26 of the tooth 23 of the locking wedge 19. The inner surface 27 of the locking wedge 19 is flat and out of contact with the filler strip 9 due to a bearing lug 28 of the locking wedge 19. The outer end surface 29 of the locking wedge 19 is substantially vertical for convenience of wedging. The inner end surface 30 of the locking wedge 19 is inclined with a slope angle chosen so as to be congruent to the slope angle of the extreme slot wedge 10 adjacent the locking wedge 19, thereby ensuring transmission of the wedging force from the locking wedge 19 to the wedge 10 retaining the winding 5.

The locking wedge 19 is embraced by an solid stop collar 31 of a resilient sheet material, disposed in extreme radial ventilating ducts 32 (FIG. 1) which are located within the end portions of the core 1. Each of the radial ventilating ducts 32 intersects the longitudinal slot 3 and is provided with an surface 33.

The shape of the stop collar 31 corresponds to the locking wedge 19 within the portion of the tooth 23 (FIG. 3) so that the stop collar 31 is in tight contact with the inclined surface 25 of the tooth 23 and with the inner surface 27 of the locking wedge 19, both surfaces facing the winding 5. A clearance 34 (FIG. 2) is provided between the collar 31 and the side surface 21 and 22 of the lug 20 of the locking wedge 19 making it possible to provide elastic deformation of the stop collars 31 when the creasts 26 (FIG. 3) of the teeth 23 on the locking wedges 19 pass therethrough as the locking wedges 19 are wedged into place.

The slope length of the stop collar 31, in longitudinal section, is equal to or slightly smaller than the slope length of the inclined surface 25 of the tooth 23 of the locking wedge 19. The upper portion of the thin end face 35 of the stop collar 25 contacts the vertical surface 24 of the tooth 23 of the locking wedge 19, while the end face 36 of the stop collar 31 is thrust against the surface 33 of the ventilating duct 32.

FIG. 4 shows an alternate embodiment of the locking wedge 19, wherein not only does the outer surface of the locking wedge 19 have a sawtooth configuration, but its bottom surface facing the filler strip 9 is formed with teeth 37 (FIG. 5) defined by vertical surfaces 38 and inclined surfaces 39 also facing the central part of the longitudinal slot 3. The shape of the stop collar 31 is shaped congruent to the inclined portions of the teeth 23 and 37 of the locking wedge 19, the width of the collar 31, in cross section, being here likewise greater than the locking wedge width, with the same cross section.

The assembly and operation of the above arrangement for locking the slot wedges retaining the electric windings 10 in position is as follows.

After the insertion of the winding 5 into the slot 3 (FIG. 1) of the core 1 followed by placing the insulating filler strip 9 on top of it, the desired number of the slot wedges 10 and 11 are driven into place in the required sequence. The locking wedges 19 are then inserted into the longitudinal slot 3 from either end thereof and pass through the stop collars 31 previously inserted into the outer radial ventilating ducts 32, the lugs 20 (FIG. 2) of the locking wedges 19 moving along the grooves 4. The movement of the locking wedges 19 through the stop collars 31 is made possible by an elastic deformation of the latter due to the clearances 34 between them and the lugs 20 of the side walls of the wedges 19, as well as by a suitable slope or tilt of the teeth 23 (FIG. 3) facing the central portion of the longitudinal slot 3. After insertion of the locking wedges 19 into the longitudinal slot 3 (FIG. 1), these wedges are urged in until the required pressure of the slot wedges 10 on the winding 5 is achieved, the teeth 23 (FIG. 3) of the locking wedges 19 sequentially passing through the stop collars 31 in the direction of the center of the longitudinal slot 3.

The backward movement of the locking wedges 19 is rendered impossible, since the reaction forces exerted on the slot wedges 10 by the winding 5 are applied to the locking wedge 19 through its inner end surface 30, and further, by way of the vertical surface 24 of the teeth 23 of this locking wedge 19 and through the stop collars 31 in contact with the vertical surface 24, to the surface 33 of the radial ventilating ducts 32 of the core 1.

During operation of the electric machine, the axial component of the force arising from various causes, which acts upon the slot wedge 10, is transferred through the vertical surface 24 of the locking the wedges 19 and through the end faces 36 of the stop collars 31 to the surface 33 of the radial ventilating ducts 32 of the core 1, thus ensuring a reliable positioning of the slot wedges 10 and 11 (FIG. 1) to retain the winding 5 within the longitudinal slot 3.

If it is necessary to remove the locking wedges 19 from the longitudinal slot 3, one need only to slightly compress the stop collars 31 over the side surfaces thereof. The side clearances 34 (FIG. 2) are then taken up, causing clearances to appear between the inclined surfaces 25 of the teeth 23 (FIG. 3) and the adjacent surfaces of the collars 31, thus allowing removal of the locking wedge 19 from the longitudinal slot 3. It will be noted that the side clearances 34 should be sufficiently wide, so that the crests 26 of the teeth 23 of the locking wedges 19 pass freely through the collars 31 when the latter are in a compressed state.

The above-noted procedure of compression of the collars 31 and the subsequent removal of the locking wedges 10 from the longitudinal slot 3 presents no special difficulties and avoids disassembling the electric machine, since the stop collars 31 are disposed, as previously described, in the extreme ventilating ducts 32 of the core 1, which are easily accessible.

The operation of the machine, according to the embodiment of the invention shown in FIGS. 4 and 5 is not substantially different from that of the principal or preferred embodiment. The choice of the particular embodiment depends on a number of factors. For example, the dual or double-sided sawtooth configuration of the locking wedge 19 provides for a more uniform distribution of the axial forces applied to the locking wedge 19 by the slot wedges 10 and 11 (FIG. 4), and permits reduction of the slope angle of the inclined surfaces 25 of the teeth 23 and the inclined surfaces 39 of the teeth 37, formed in the wedge 19, contributing to easy wedging upon assembling of this particular arrangement in an electric machine.

The locking wedges 19 are made of a high-strength insulating material which can be cut or molded to the shapes described. In the given embodiment of the invention, the locking wedges 19 are molded from a thermosetting fibrous compound comprising a modified phenol-formeldehyde resin binder with a glass fiber or glass thread filler.

The stop collars 31 are formed of thin-sheet construction steel designed for machining by deep extrusion, or may be made from some other suitable resilient materials.

In the embodiment of the invention described, the best results are obtained if the side clearances 34 (FIG. 2) between the inner side portions of the stop collars 31 and the inclined surfaces 21 and 22 of the locking wedges 19 are chosen within 2 to 6 mm, with the average height of the collar 31, in cross section, on the order of 8 to 15 mm.

The proposed arrangement of locking the slot wedges for retaining the winding in the slot of an electric machine core is advantageously used when securing the windings of the electric machines with the power capacity of 500 kW and up.

The arrangement for locking the slot wedges retaining electric winding, in accordance with the present invention, provides for:

a significant reduction of the number of failures caused by the slot wedges coming out of the longitudinal slots with a consequent loosening of the windings;

an easy maintenance facilitating readjustment and reinsertion of the wedges; and a reduction of repair time needed for readjustment and reinsertion of the wedges.

It is to be understood that numerous modifications and other embodiments of the proposed arrangement for locking the slot wedges in position for retaining the electric windings of an electric machine core may be devised, other than described hereinbefore, without departing from the true scope of the invention.

What is claimed is:

1. In an magnetic core of an electric machine, having longitudinal slots arranged around the periphery thereof and provided with longitudinal grooves on the side walls near the top of the slots, said slots including a winding disposed therein, a plurality of radial ventilating ducts extending across said longitudinal slots, a plurality of slot wedges located end-to-end in the top portions of said longitudinal slots above said winding to retain said winding from displacement within said slots, and an arrangement for locking said slots wedges, disposed in the end portions of each of said longitudinal slots; said arrangement comprising:

locking wedges disposed in said longitudinal slot and contacting the extreme slot wedges and having lugs on the side portions thereof, engaging said grooves of said longitudinal slot, and teeth on the surfaces parallel to the bottom of said longitudinal slots, defined by an inclined plane facing the central portion of said longitudinal slot from the ends thereof, and a plane perpendicular to the axis of said core;

stop collars, disposed at the points of the intersection of said longitudinal slots and the extreme radial ventilating ducts, embracing said locking wedges, said stop collars shaped congruent to said locking wedge within a tooth portion thereof, the portions of said stop collars facing the winding being in tight contact with the mating portions of said locking wedge and the inner side portions of said stop collar being spaced from the lateral sides of said locking wedge with side clearances formed therebetween, said side clearances enabling said locking wedge to be urged in said longitudinal slot along said grooves toward the central portion of said longitudinal slot from the ends thereof, one end face of said stop collar contacting the surface of said tooth of said locking wedge, defined by the plane perpendicular to the axis of said core, and the other end face of said stop collar bearing against the surface of said extreme radial ventilating ducts; whereby said slot wedges are prevented from any axial displacement in said longitudinal slots.

2. An arrangement for locking said slot wedges according to claim 1, wherein said teeth are formed on the outer side of said locking wedge.

3. An arrangement for locking said slot wedges according to claim 1, wherein said teeth are formed both on the outer and inner sides of said locking wedge.

4. An arrangement for locking said slot wedges according to claim 1, wherein said stop collars are of resilient material.

5. An arrangement for locking said slot wedges according to claim 2, wherein said stop collars are of resilient material.

6. An arrangement for locking said slot wedges according to claim 3, wherein said stop collars are of resilient material.

7. An arrangement for locking said slot wedges according to claim 1, wherein said side clearances between said stop collars and said locking wedges range between about 2 mm to 6 mm.

8. An arrangement for locking said slot wedges according to claim 2, wherein said stop collar has an average height in cross-section of about 8 mm–15 mm.

9. An arrangement for locking said slot wedges according to claim 1, wherein said locking wedges are made from a thermosetting fibrous compound comprising a modified phenolformaldehyde resin binder with a filler selected from the group consisting of glass or glass thread.

* * * * *